United States Patent [19]

Salisbury

[11] Patent Number: 5,682,988
[45] Date of Patent: Nov. 4, 1997

[54] DISC STORAGE CASE

[76] Inventor: Philip S. Salisbury, 3004 Arlington Dr., Springfield, Ill. 62704

[21] Appl. No.: 620,104

[22] Filed: Mar. 21, 1996

[51] Int. Cl.$^6$ ............................................. B65D 85/57
[52] U.S. Cl. ........................ 206/303; 206/308.1; 206/309
[58] Field of Search ............................. 206/303, 308.1, 206/308.2, 309, 310, 493

[56] References Cited

U.S. PATENT DOCUMENTS

| | | | |
|---|---|---|---|
| 3,949,872 | 4/1976 | Paudras | 206/310 |
| 4,709,813 | 12/1987 | Wildt | 206/310 |
| 4,819,799 | 4/1989 | Nomula et al. | 206/308.1 |
| 5,188,229 | 2/1993 | Bernstein | 206/308.1 |
| 5,238,107 | 8/1993 | Kownacki | 206/308.1 |
| 5,284,242 | 2/1994 | Roth et al. | 206/310 |
| 5,361,903 | 11/1994 | Thiele | 206/310 |

*Primary Examiner*—Jimmy G. Foster
*Attorney, Agent, or Firm*—Lisa A. Uldrich

[57] ABSTRACT

A case for storing a disc having a central aperture. The case has first and second panels hingedly connected together and adapted to be closed together to form a generally flat, rectangular enclosure for containing a disc. A tapering boss projects from the first panel inside the enclosure on which the central aperture of the disc can be mounted. A retainer ring associated with the second panel is adapted to fit over the boss when the panels are closed together to retain the disc on the hub of the boss.

15 Claims, 2 Drawing Sheets

DISC STORAGE CASE

FIELD OF THE INVENTION

This invention relates to a storage case for storing a disc, such as a compact disc.

BACKGROUND OF THE INVENTION

Information storage discs such as compact discs must be protected from dust and dirt which can interfere with information retrieval, and from physical damage which can cause a loss of data. Currently available compact disc storage cases protect compact discs from dust and dirt and some physical damage. These disc cases have a resilient hub that engages the central opening in the disc to securely hold the disc within the case. The hub must be pressed to release the disc from the hub, otherwise the disc will bend as it is pulled from the case, which can damage the disc. Many users, however, fail to properly release the disc when they remove discs from conventional compact disc cases. Thus, while conventional compact disc cases do protect compact discs, they also pose some risks to these discs.

SUMMARY OF THE INVENTION

The disc storage case of the present invention is adapted for storing information storage discs of the type having a central aperture, such as a compact disc. The disc case encloses the disc, protecting it from dust and dirt, and suspends the disc within the case to protect it from scratching and other damage. While the case securely holds the disc when the case is closed, when the case is open the disc can be freely placed into or removed from the case, without the risk of bending or damaging the disc.

Generally, the disc storage case of the present invention comprises first and second panels hingedly connected together. The panels are adapted to be closed together to form a generally flat, rectangular enclosure for containing a disc. The disc storage case includes a tapering boss projecting from the first panel inside the enclosure on which the central aperture of the disc can be mounted. In addition, the case includes a retainer ring associated with the second panel. The retainer ring is adapted to fit over the boss when the panels are closed together to retain the disc on the boss. The ring and the tapering boss cooperate to suspend the disc between the panels.

The disc storage case of the present invention is of simple and inexpensive construction. It can be made with just minor modifications to conventional disc storage cases. The case securely holds a disc between and spaced from the panels of the case, when the case is closed. When the case is open, the disc can easily be removed without the need to release the disc, and without risk of bending or damaging the disc.

These and other features and advantages will be in part apparent, and in part pointed out, hereinafter.

BRIEF DESCRIPTION OF THE DRAWINGS

Corresponding reference numerals indicate corresponding parts throughout the several views of the drawings.

DETAILED DESCRIPTION OF THE PREFERRED EMBODIMENT

A disc storage case constructed according to the principles of this invention is indicated generally as 20 in the Figures. The disc storage case 20 is adapted for storing information storage discs of the type having a central aperture, such as compact discs.

The disc storage case 20 is preferably similar in construction to conventional compact disc storage cases, and in fact conventional compact disc storage cases could be modified in accordance with the principles of this invention with minimal effort and expense. The disc storage case 20 comprises first and second panels 22 and 24. The panels 22 and 24 are hingedly connected so that they can be closed together to form a generally flat, rectangular enclosure for containing a disc.

Figure 4:
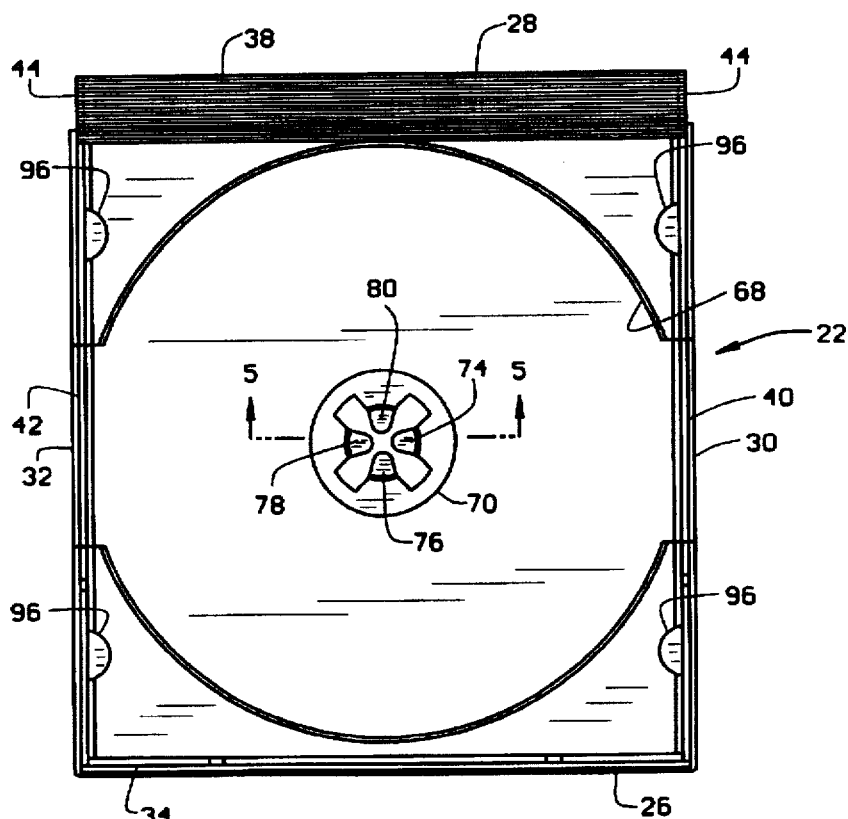
FIG. 4 is a top plan view of the first panel, showing the tapering boss.
Figure 5:
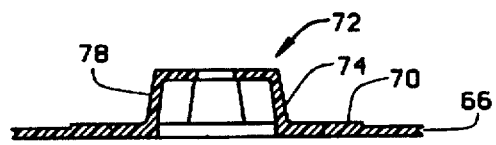
FIG. 5 is a cross-sectional view of the tapering boss taken along the plane of line 5—5 in FIG. 4.

More specifically, as shown in FIG. 4 the first panel 22 has a rectangular shape, with a front edge 26, a back edge 28, and side edges 30 and 32. There is a front wall 34 at the front edge 26, and a back wall 38 at the back edge 28. There are side walls 40 and 42 offset inwardly from the side edges 30 and 32, respectively. There are holes 44 in each sidewall 40 and 42, adjacent the back edge 28, for hingedly mounting the second panel 24 as described below.

Figure 1:
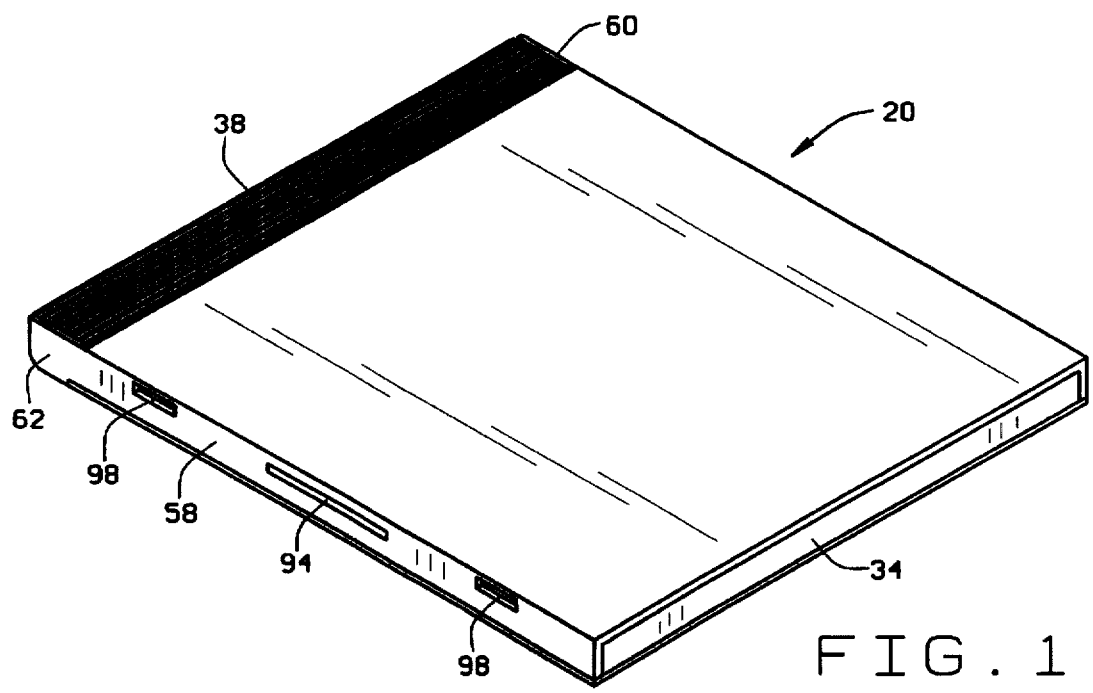
FIG. 1 is a perspective view of a disc storage case constructed according to the principles of this invention.
Figure 2:
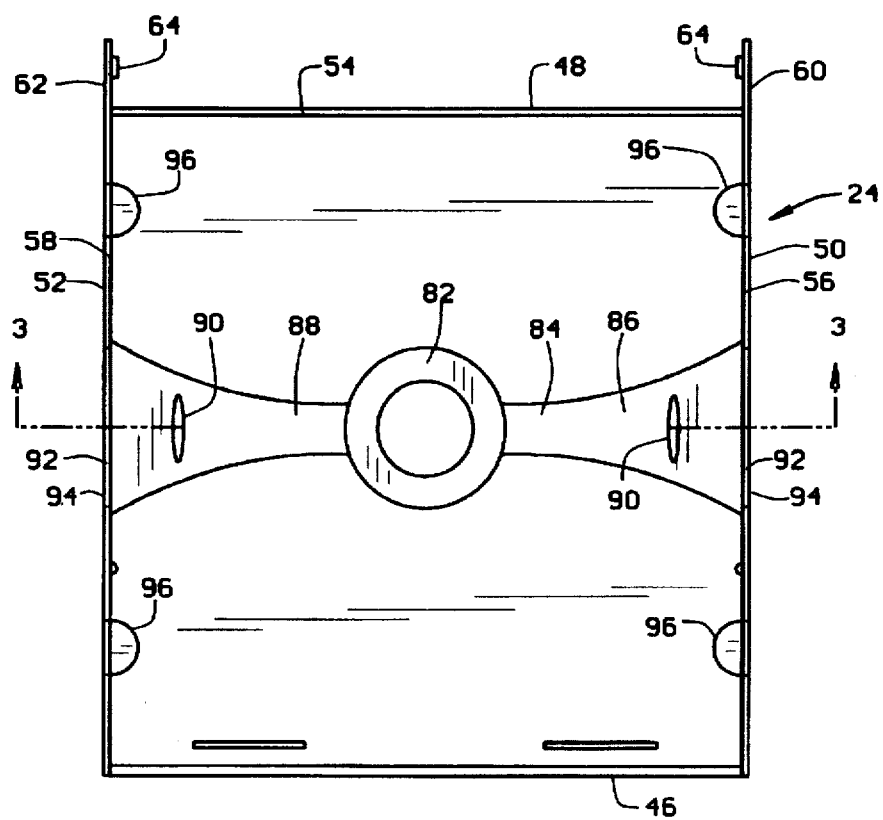
FIG. 2 is a top plan view of the second panel of the disc storage case, showing the retainer ring.
Figure 6:
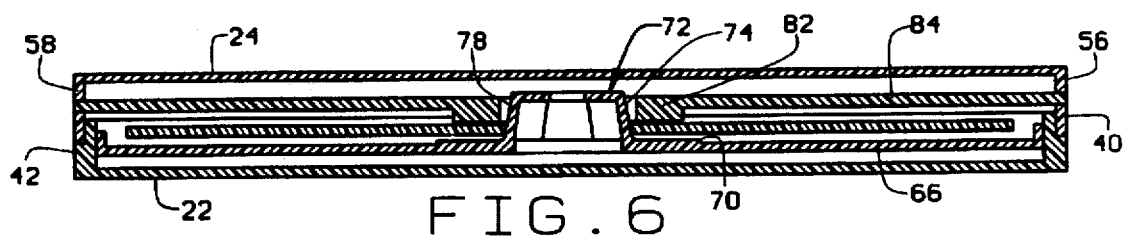
FIG. 6 is a cross-sectional view of the case shown with a compact disc held therein.

As shown in FIG. 2, the second panel 24 also has a rectangular shape, with a front edge 46, a back edge 48, and side edges 50 and 52. There is a back wall 54 adjacent the back edge 48, and sidewalls 56 and 58 at the side edges 50 and 52. Tabs 60 and 62 project from the sidewalls 56 and 58, at the back edge 48 of the panel 24. There are nubs 64 on the opposing faces of the tabs 60 and 62, adapted to fit in the holes 44 in the sidewalls 40 and 42 of the first panel 22, to hingedly attach the panels. The hingedly attached panels 22 and 24 can pivot between a closed position, in which the panels interfit to form a flat rectangular prismatic container, and an open position. In the closed position the front wall 34 and the back wall 38 close the front and back of the case, and the sidewalls 56 and 58 on the panel 24 overlap the sidewalls 40 and 42 on the first panel 22, closing the sides of the case as shown in FIG. 6.

As in a conventional compact disc case, an insert 66 fits within the first panel 22. The insert 66 includes generally circular receptacle 68 for receiving the disc. In the center of the receptacle 68 there is a raised land 70, and in the center of the raised land 70 is a generally tapering boss 72. The boss 72 tapers inwardly from its base and has an external diameter that is smaller than the internal diameter of the central opening in the disc and the external diameter of the base of the boss 72 where it extends from the land 70. Moreover, the external diameter of the boss 72 at its base is not greater than the internal diameter of the central opening in the disc. The boss 72 is adapted to mount the central opening of the disc. The tapering configuration of the boss allows the disc to slide down the boss until the external diameter of the boss matches or closely approximates the size of the central opening in the disc. In one embodiment, the boss 72 has a generally frustoconical shape defined by four flexible tabs 74, 76, 78, and 80 that project upwardly from the land 70. The proximal or root portions of the tab slope generally inwardly toward the center, forming the tapering surface of the boss 72. The distal or end portions of the tabs extend horizontally inwardly toward the center, forming the top of the boss 72. The boss 72 may also comprise other configurations such as tubular, or solid frustoconical shapes which project upwardly from the land 70 to receive the disc opening.

A retainer ring 82 is mounted on the second panel 24, to retain a disc on the hub of the boss 72 when the panels are closed together. The retainer ring is adapted to fit over the boss 72 and hold the disc against the boss, suspending it between the panels so that the recorded surface of the disc does not touch the panels or the cross piece 84 supporting the retainer ring 82. The retainer ring 82 is centrally located within a cross piece 84.

Figure 3:
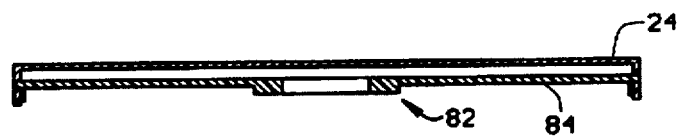
FIG. 3 is a cross-sectional view of the second panel taken along the plane of line 3—3 in FIG. 2.

The cross piece 84 extends between the sidewalls 56 and 58 of the second panel 24 by support arms 86 and 88. The cross piece 84 is preferably positioned intermediate the front and rear edges of the panel 24, where the sidewalls 40 and 42 are lower so that the sidewalls 40 and 42 do not interfere with the cross piece. The support arms 86 and 88 of the cross piece 84 taper from each end toward the center preferably forming a generally hourglass shape. This configuration not only saves material, but increases the flexibility of the center of the cross piece. In one embodiment, oval apertures 90 on the outer ends of cross piece 84 provide entrance slots for an assembly device so that cross piece 84 may be automatically inserted within the panel 24 eliminating the need for manual insertion. The ends of the cross piece 84 have tabs 92 that fit into slots 94 in the sidewalls 56 and 58. As shown in FIG. 3, there is a space between the cross piece 84 and the inner surface of the second panel 24 which allows for printed material to be easily inserted and withdrawn without interfering with closure of the case. More specifically, printed material may be inserted on the inner surface of the second panel 24 and held thereto by tabs 96 extending from apertures 98.

Thus, the disc storage case of the present invention can be made from conventional compact disc storage cases with minor modifications. The insert 66 is substituted for the conventional insert, and a separate cross piece 84 is formed and installed in notches formed in the sidewalls of the cover.

Operation

In operation, the disc storage case 20 is opened, and a disc is placed on the boss 72. The disc slides down on the boss until the diameter of the boss corresponds to the diameter of the central opening in the disc. The boss is designed so that the disc will be spaced from the surface of the insert 66, as best shown in FIG. 6. When the panel 24 is pivoted closed, the retainer ring 82 fits over the distal end of the boss, and engages the inner edge margins of the disc, pressing the disc against the boss. The flexibility of the cross piece 84 allows the disc to assume a position inside the case spaced from the sidewalls. The disc is held firmly in place, out of contact with the case, except at the hub, so the information storage surfaces of the disc are protected from damage.

When the disc storage case is opened, the disc can simply be lifted from the boss 72, without the need to release the disc as in the present disc storage cases. This eliminates the risk of bending or warping the disc if the user forgets to, or fails to completely depress the hub of a conventional disc storage case.

Thus the disc storage case of the present invention provides complete protection of the disc, and in particular the information storage surfaces such as the recorded surface of a compact disc, yet eliminates the risk of bending the disc upon insertion or removal that is experienced with conventional storage cases.

I claim:

1. A case for storing a disc having a central aperture, the case comprising:
    first and second panels hingedly connected together, and adapted to be closed together to form a generally flat, rectangular enclosure for containing a disc;
    a tapering boss, projecting from the first panel inside the enclosure, on which the central aperture of the disc can be mounted; and
    a retainer ring, associated with the second panel, adapted to fit over the boss when the panels are closed together to retain the disc on the hub of the boss, wherein the ring is resiliently mounted on the second panel to deflect axially with respect to the boss to accommodate the position of the disc on the boss.

2. A case for storing a disc having a central aperture, the case comprising:
    first and second panels hingedly connected together, and adapted to be closed together to form a generally flat, rectangular enclosure for containing a disc, wherein the first and second panels are generally rectangular, the second panel having sidewalls on opposite side edges which form the sides of the enclosure when the panels are closed together;
    a tapering boss, projecting from the first panel inside the enclosure, on which the central aperture of the disc can be mounted; and
    a retainer ring, associated with the second panel, adapted to fit over the boss when the panels are closed together to retain the disc on the hub of the boss, wherein the retainer ring is formed in a cross piece extending between the sidewalls.

3. A case for storing a disc having a central aperture, the case comprising:
    first and second panels hingedly connected together, and adapted to be closed together to form a generally flat, rectangular enclosure for containing a disc, wherein the first and second panels are generally rectangular, the second panel having an inner surface and sidewalls on opposite side edges which form the sides of the enclosure when the panels are closed together;
    a tapering boss, projecting from the first panel inside the enclosure, on which the central aperture of the disc can be mounted; and
    a retainer ring, associated with the second panel, adapted to fit over the boss when the panels are closed together to retain the disc on the hub of the boss, wherein the retainer ring is formed in a cross piece extending between the side walls, wherein the cross piece has first and second ends attached to the sidewalls, and wherein the cross piece is wider at the ends than in between the ends.

4. A case for storing a disc having a central aperture, the case comprising:
    first and second panels hingedly connected together, and adapted to be closed together to form a generally flat, rectangular enclosure for containing a disc, wherein the first and second panels are generally rectangular, the second panel having an inner surface and sidewalls on opposite side edges which form the sides of the enclosure when the panels are closed together;
    a tapering boss, projecting from the first panel inside the enclosure, on which the central aperture of the disc can be mounted; and
    a retainer ring, associated with the second panel, adapted to fit over the boss when the panels are closed together to retain the disc on the hub of the boss, wherein the retainer ring is formed in a cross piece extending between the sidewalls, wherein the cross piece is positioned a predetermined distance from the inner surface of the second panel forming a space to accommodate printed material.

5. A case for storing a disc having a central aperture, the case comprising:

first and second panels each having a surface, the first and second panels hingedly connected together, and adapted to be closed together to form a generally flat, rectangular enclosure for containing a disc;

a tapering boss, projecting from the first panel inside the enclosure, on which the central aperture of the disc can be mounted such that the disc is suspended above the surface of the first panel; and a retainer ring having an upper surface, suspended from the second panel, adapted to engage the enclosure so that there is a space between the upper surface of the retainer ring and the second panel, adapted to fit over the boss when the panels are closed together to retain the disc on the hub, spaced from the surface of the second panel.

6. The case according to claim 5 wherein the ring is resiliently mounted on the second panel to deflect axially with respect to the boss to accommodate the position of the disc on the boss.

7. The case according to claim 5 wherein the tapering boss is a truncated cone.

8. The case according to claim 5 wherein the tapering boss has a top having a diameter that is smaller than the diameter of the central aperture of the disc, and a base having a diameter substantially the same as the diameter of the central aperture of the disc.

9. The case according to claim 5 wherein the first and second panels are generally rectangular, the second panel an inner surface and having sidewalls on opposite side edges which form the sides of the enclosure when the panels are closed together, and wherein the retainer ring is formed in a cross piece extending between the sidewalls.

10. The case according to claim 9 wherein the cross piece has first and second ends attached to the sidewalls, and wherein the cross piece is wider at the ends than in between the ends.

11. The case according to claim 9 wherein the cross piece is positioned a predetermined distance from the inner surface of the second panel forming a space to accommodate printed material.

12. In a case for an information storage disc of the type comprising first and second panels each having a surface, the first and second panels hingedly connected together and having interfitting sidewalls thereon so that when the panels are hingedly closed together they form a generally flat, rectangular enclosure for containing a disc, the improvement comprising:

a tapering boss, projecting from the first panel inside the enclosure on which the central aperture of the information disc can be mounted, the boss tapering at a rate that the disc is suspended over the surface of the first panel, and a retainer ring having an upper surface, suspended from the second panel, adapted to engage the enclosure so that there is a space between the upper surface of the retainer ring and the second panel, adapted to fit over the end of the tapering boss and secure a disc thereon, spaced from the surface of the second panel.

13. The improvement of claim 12 wherein the tapering boss is a truncated cone.

14. The improvement of claim 12 wherein the tapering boss has a top having a diameter that is smaller than the diameter of the central aperture of the disc, and a base having a diameter substantially the same as the diameter of the central aperture of the disc.

15. The improvement of claim 12 wherein the ring is resiliently mounted on the second panel to deflect axially with respect to the boss to accommodate the position of the disc on the boss.

* * * * *